UNITED STATES PATENT OFFICE.

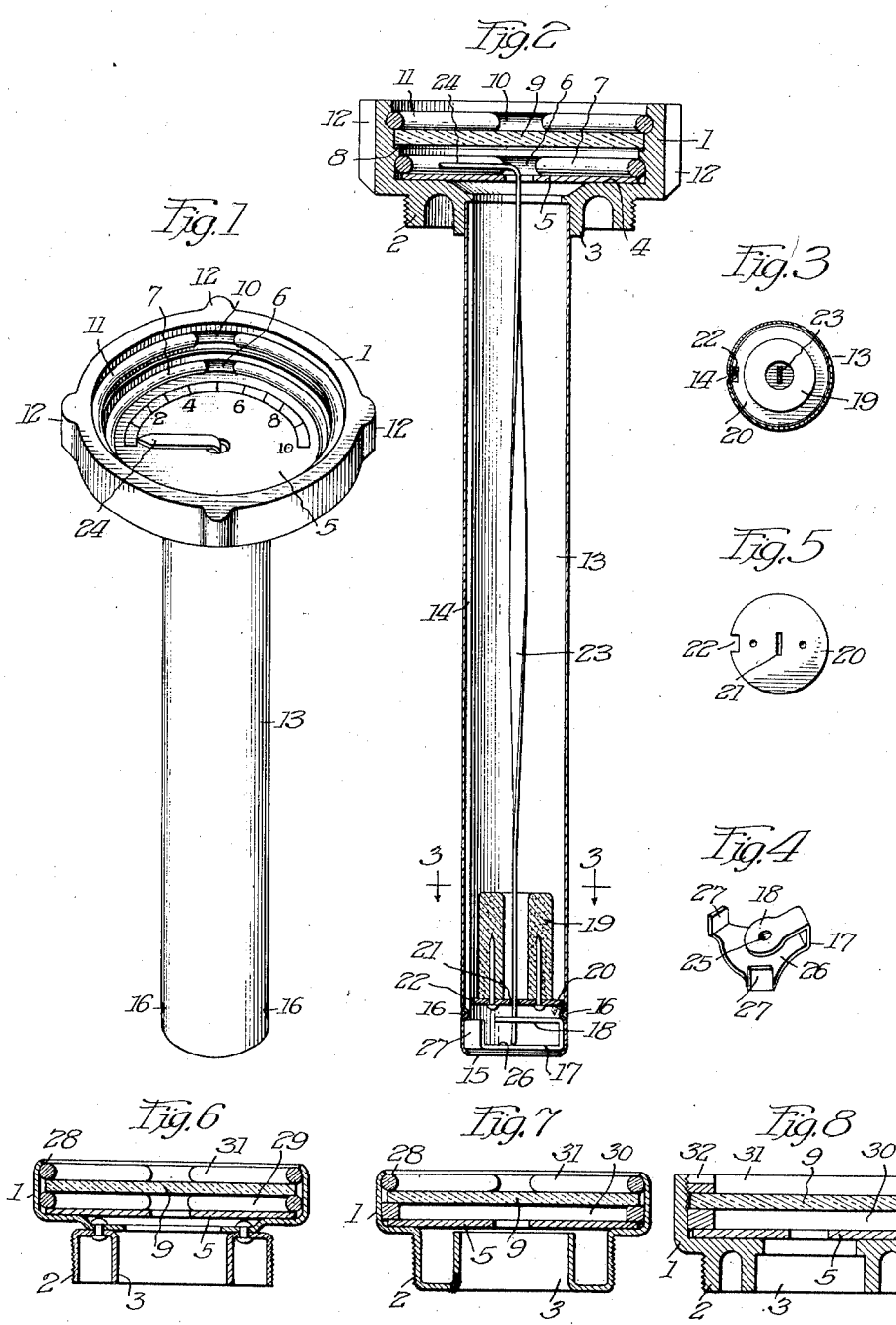

OLIVER C. RITZ-WOLLER, OF CHICAGO, ILLINOIS.

FLUID-GAGE.

1,366,214.  Specification of Letters Patent.  Patented Jan. 18, 1921.

Application filed March 16, 1918. Serial No. 222,838.

*To all whom it may concern:*

Be it known that I, OLIVER C. RITZ-WOLLER, a citizen of the United States, residing at Chicago, in the county of Cook and State of Illinois, have invented a certain new and useful Improvement in Fluid-Gages, of which the following is a full, clear, concise, and exact description.

This invention relates to improvements in gages and more particularly to gasolene gages of the spiral filler cap type adapted for use in connection with automobiles and the like.

One object of the invention is to provide a gage of this type which shall be simple in construction and operation and one which lends itself readily to economical manufacture.

Another object is to provide a gasolene gage, the operating and indicating parts of which are completely housed and protected by an exterior structure of rigid and rugged design whereby said gage is not injured by the rough use to which it is subject.

A further object is to provide a simple and effective gage of the type described which shall comprise novel means for supporting and centering the indicator spindle.

Other objects and advantages will be apparent from the following description taken in connection with the accompanying drawings wherein the preferred embodiment of the invention is illustrated.

Figure 1 is a perspective view of a gage embodying the present invention.

Fig. 2 is a vertical sectional view thereof.

Fig. 3 is a transverse sectional view on the line 3—3 of Fig. 2.

Fig. 4 is a perspective view of the indicator spindle support and centering member.

Fig. 5 is a detail view of the float guide plate, and

Figs. 6, 7, and 8 are sectional views illustrating slightly-modified forms of dial casings.

Referring more in detail to the drawings, the gage is shown as comprising a dial cap or casing 1, preferably in the form of a casting, provided with an outer depending annular flange 2 and an inner depending annular flange 3, said flange 3 being preferably concentric with the flange 2. The outer flange 2 is provided with suitable screw threads in order that the casing 1 may be readily screwed into the usual filler cap opening of the gasolene tank (not shown). The base of the casing 1 constitutes a seat 4 for the dial plate 5, there being an annular groove 6 formed around the inner surface of the casing 1 immediately above the seat 4, which groove is adapted to receive a spring ring 7 in order to clamp the dial plate securely in position on its seat. A second seat 8 is provided within the casing 1 on which is adapted to rest a suitable glass disk 9. An annular groove 10, similar to the groove 6, is provided in the casing 1. immediately above the glass disk 9, said groove being also adapted to receive a suitable spring ring 11 which, when snapped in position within said groove 10 acts to securely clamp the glass disk on its seat 8. The casing 1 is preferably exteriorly provided with a plurality of projections or lugs 12 in order that a firm grip may be had thereon when it is desired to screw said casing into position.

The depending annular flange 3 receives and supports, either by friction, solder or some other suitable means, a float housing 13 which is preferably in the form of an elongated tube crimped longitudinally, as shown at 14. The lower end of the tube is pressed inwardly to provide suitable flanges 15 and 16, which flanges hold securely in place a suitable support or spider 17, said spider being provided with a centering finger 18, preferably integral therewith, as shown more in detail in Fig. 4. The flange 15 at the extreme end of the tube 13 is continuous, whereas the projections 16 are merely provided at intervals around the circumference of the tube immediately above the ends of the upstanding lugs 27, the centering finger 18 being an extension of one of these lugs, as shown in Fig. 4. In this manner, it will be noted that the spider 17 is rigidly held in place.

A float 19 of cork, or some other suitable material, is positioned within the tube 13, the lower surface of said float being provided with a suitable plate 20, preferably of metal, slotted as at 21 and notched as at 22, said notch being adapted for engagement with the longitudinal bead or crimping 14 whereby the float 19 is prevented from revolving within the tube 13 as the float rises and falls therein with the level of the liquid. The indicator spindle is illustrated at 23 and is preferably in the form of a spiral as shown, the upper end of said spindle being bent over to provide an indicating needle 24 which is adapted to sweep the face of the dial plate 5.

The lower end of the spiral or spindle 23 passes through the aperture 25 provided in the centering finger 18, and is supported on the base plate 26 of the spider 17 as clearly shown in Fig. 2. The spiral 23 is also adapted to pass through the slot 21 provided in the float guide plate 20 and from this it will be noted that as the float 19 rises and falls within the tube 13, the spiral 23 will be rotated on its support 17, thereby causing the indicating needle 24 to sweep the dial plate 5 and indicate the amount of gasolene or other liquid within the tank.

In Figs. 6, 7 and 8 slightly modified forms of dial casings are shown. In Figs. 6 and 7 the casing is preferably in the form of a stamping and is provided with an inturned flange 28 formed by pressing over the upper edge of the casing as shown. In these forms of the invention and in the form shown in Fig. 8, the grooves and seat provided around the inner periphery of the casing, as shown in the preferred embodiment, are dispensed with, the dial plate 5 being placed on the bottom of said casing, a spacing member in the form of a spring retaining ring 29 in Fig. 6 and in the form of a gasket 30 in Figs. 7 and 8, is then pressed down on the dial plate, said spacing members 29 and 30 providing a seat for the glass disk 9, all of these elements being held securely in place by a suitable retaining ring 31. In Figs. 6 and 7 this retaining ring is held in place by the overhanging flanges 28 of the casing, substantially as shown, whereas in Fig. 8 the ring 31 is slotted as at 32 and is adapted to be screwed down into position on the glass disk 9 as shown, by means of a suitable key or other means, (not shown), the casing in this form of housing being preferably a casting.

While the features of construction, above described, have been illustrated herein in connection with a filler cap gage of the spiral type, it is obvious that many of said features are not limited in their use to a gage of this particular type, but are more or less of general adaptation. For instance, certain of the features might be embodied in gages of the gear or loop movement type and also in many other types of gages. In other words, it is not desired to limit the construction to a spiral filler cap gage.

It is also obvious that the structure herein illustrated and described is susceptible to many changes and modifications and it is not, therefore, desired to limit the same except where limitations appear in the appended claims.

Having thus described my invention, what I claim as new and desire to secure by Letters Patent of the United States is:—

1. A gage comprising a dial casing, a float housing suspended therefrom, a float within said housing, a spindle passing through said float and adapted to be revolved by the rise and fall of the latter, an indicator needle at the upper end of said spindle within said casing, a plurality of longitudinally spaced projections within and near the lower end of said housing, a spider held by said projections and adapted to support said spindle, and a centering finger integral with said spider for maintaining said spindle in operative position.

2. A gage comprising a dial casing, a float housing suspended therefrom, said housing being constructed of sheet material curved to cylindrical form and having its longitudinal edges crimped together, a float within said housing, the periphery of said float being engaged by said crimped edge in such wise as to prevent said float rotating while permitting it to rise and fall, a spiral spindle supported in said housing and passing through a slot in said float, whereby said spindle is revolved upon the rise or fall of said float, and an indicator needle at the upper end of said spindle within said casing.

3. The combination with a liquid level gage having a spindle, an actuating float therefor and a housing, of a member carried by said housing adjacent the lower end thereof for supporting said spindle, and a centering finger carried by said member and engaging said spindle above said support to maintain the same centrally disposed within said housing and against accidental displacement.

In witness whereof I hereunto subscribe my name this 11th day of March, A. D. 1918.

OLIVER C. RITZ-WOLLER.